United States Patent
Sugaya

(10) Patent No.: US 11,310,431 B2
(45) Date of Patent: Apr. 19, 2022

(54) CONTROL APPARATUS, IMAGE PICKUP SYSTEM, AND STORAGE MEDIUM FOR CHANGING IN-FOCUS RANGE

(71) Applicant: CANON KABUSHIKI KAISHA, Tokyo (JP)

(72) Inventor: Atsuto Sugaya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 91 days.

(21) Appl. No.: 16/816,550

(22) Filed: Mar. 12, 2020

(65) Prior Publication Data

US 2020/0304721 A1 Sep. 24, 2020

(30) Foreign Application Priority Data

Mar. 20, 2019 (JP) .............................. JP2019-053320

(51) Int. Cl.
*H04N 5/232* (2006.01)

(52) U.S. Cl.
CPC ... *H04N 5/232939* (2018.08); *H04N 5/23216* (2013.01); *H04N 5/23299* (2018.08); *H04N 5/232121* (2018.08); *H04N 5/232945* (2018.08)

(58) Field of Classification Search
None
See application file for complete search history.

(56) References Cited

U.S. PATENT DOCUMENTS

| | | | |
|---|---|---|---|
| 2012/0169902 A1* | 7/2012 | Matsuzawa | H04N 5/2621 348/239 |
| 2012/0307091 A1* | 12/2012 | Yu | H04N 5/23218 348/211.4 |
| 2015/0138383 A1* | 5/2015 | Kelley | H04N 5/2628 348/208.6 |
| 2017/0272658 A1* | 9/2017 | Ito | G03B 13/36 |
| 2020/0267298 A1 | 8/2020 | Sugaya | |

FOREIGN PATENT DOCUMENTS

JP 2014197824 A * 10/2014 ....... H04N 5/232935
JP 2017098613 A 6/2017

* cited by examiner

*Primary Examiner* — Quan Pham
(74) *Attorney, Agent, or Firm* — Carter, DeLuca & Farrell LLP

(57) ABSTRACT

In an image pickup apparatus that can change an in-focus range by driving an aperture stop and changing a tilt angle, the in-focus range can be easily changed. A control apparatus of an image pickup apparatus includes a tilt changing unit that changes a tilt angle that is a relative angle between a lens and an image pickup element and an aperture driving unit that drives an aperture stop. The control apparatus comprises a request unit configured to request the image pickup apparatus to provide any one of at least the tilt angle, an aperture value, and a focus position; and a display controller configured to display an in-focus range of the image pickup apparatus on a display unit, wherein the display controller changes a content to be displayed on the display unit based on the information acquired by the request unit.

10 Claims, 13 Drawing Sheets

CONTROL APPARATUS, IMAGE PICKUP SYSTEM, AND STORAGE MEDIUM FOR CHANGING IN-FOCUS RANGE

BACKGROUND OF THE INVENTION

Field of the Invention

The present invention relates to a control apparatus, an image pickup system, and a storage medium.

Description of the Related Art

There have been cases in which a monitoring camera is installed at a high place, where the optical axis of the camera is directed obliquely downward to monitor people passing on a road and pick up an image of a vehicle and a license plate thereof. A focal plane, which is a plane on which an object is in focus when images are picked up, is a plane perpendicular to the optical axis. When the optical axis of the camera is directed obliquely downward, a plane in which the object to be imaged is present does not match the focal plane. Therefore, there are cases in which only a part of a plurality of objects present on the road surface is in focus.

To solve the above drawback, the following first or second method is used. In the first method, a depth of field is increased by narrowing the aperture stop of an optical system. However, there are cases in which imaging is performed in a manner in which the aperture stop is opened under low-illumination intensity due to a limit to the range of adjustment of the depth of field, thereby causing an insufficient depth of field depending on the imaging environment.

In contrast, in the second method, the focal plane is tilted by tilting the optical system with respect to an image pickup element or tilting the image pickup element with respect to the optical system (hereinafter, a relative angle between a lens and the image pickup element is referred to as a "tilt angle") by performing a tilt operation on the optical system or the image pickup element (hereinafter, referred to as "tilt"). In this method, focus adjustment is performed by matching the plane in which the object is present with the focal plane. However, if monitoring a plurality of objects having different heights is desired, the necessity to increase the depth of field by further narrowing the aperture stop may arise.

Japanese Patent Application Laid-Open No. 2017-98613 discloses a technique that automatically selects a mode that performs shooting by controlling only an aperture stop or a mode that performs shooting by controlling both the aperture stop and the tilt, by using information about a distance from a camera to an object.

In the monitoring camera, an object to be monitored is not always present constantly and the distance from the camera to the object may also change from time to time. Hence, from the viewpoint of response and durability of a driving unit, there are cases in which a user manually adjusts a tilt angle and an aperture stop so as to set a range in which the object can be considered to be in focus (hereinafter, referred to as an "in-focus range"). It is difficult to adjust the tilt angle and the aperture stop while checking the shot image, which requires time and labor. Additionally, when the tilt angle and the aperture stop are adjusted, preparing a plurality of objects is actually required, which is not easy. In Japanese Patent Application Laid-Open No. 2017-98613, there is no description about a countermeasure against such a drawback, thereby it may be difficult for a user to manually set an in-focus range.

SUMMARY OF THE INVENTION

It is an object of the present invention to provide a control apparatus that can easily change an in-focus range in an image pickup apparatus that can change the in-focus range by driving the aperture stop and changing the tilt angle.

In order to achieve the above object, the present invention provides a control apparatus for an image pickup apparatus including a tilt changing unit that changes a tilt angle, which is a relative angle between a lens and an image pickup element, and an aperture driving unit that drives an aperture stop comprising: a request unit configured to request the image pickup apparatus to provide any one of at least the tilt angle, an aperture value, and a focus position; and a display controller configured to display an in-focus range of the image pickup apparatus on a display unit, wherein the display controller changes a content to be displayed on the display unit based on the information acquired by the request unit.

Further features of the present invention will become apparent from the following description of exemplary embodiments with reference to the attached drawings.

DESCRIPTION OF THE EMBODIMENTS

A preferred embodiment of the present invention will now be described in detail with reference to the accompanying drawings.

First Embodiment

A network configuration according to the first embodiment of the present invention will be described below with reference to FIG. 1.

Figure 1:
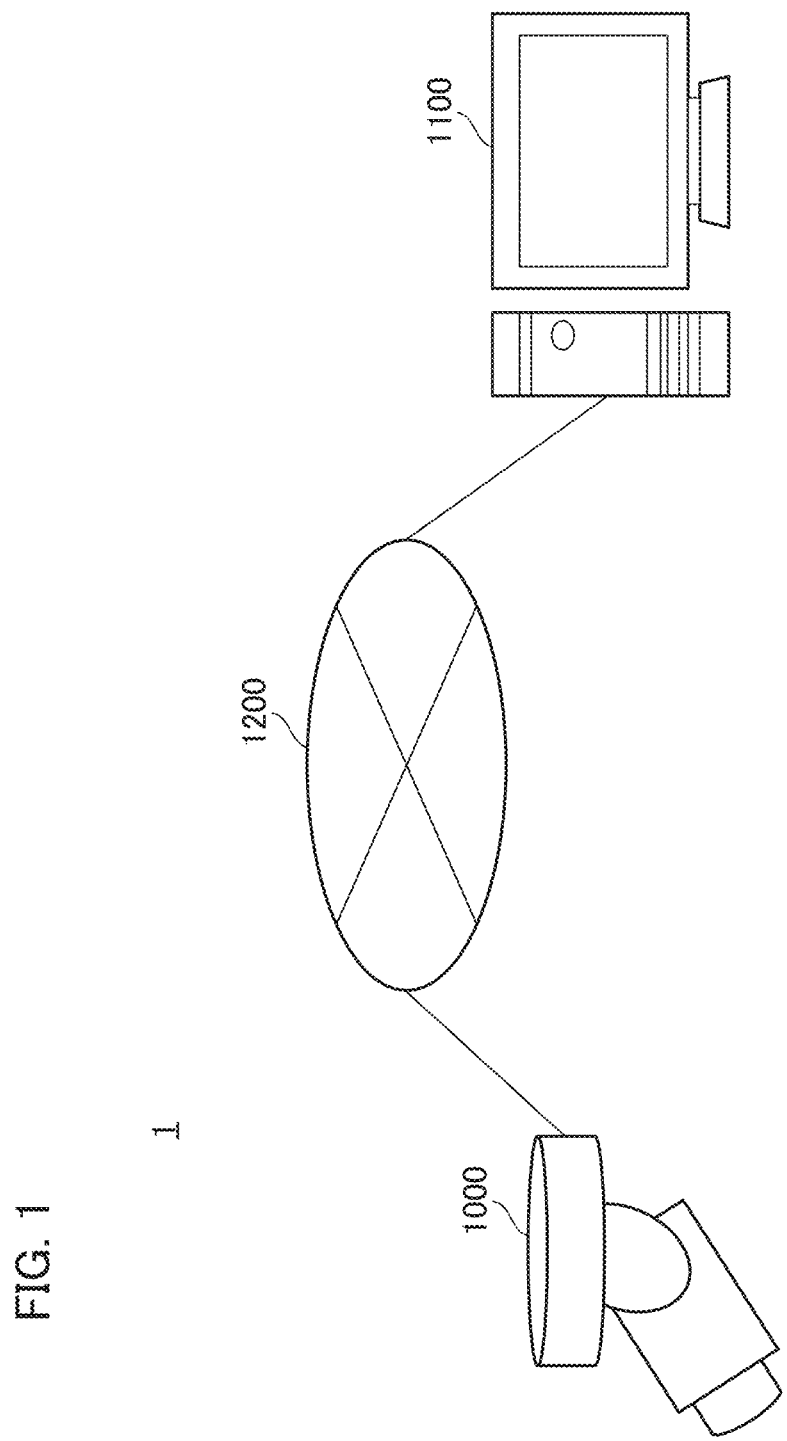
FIG. 1 is a system configuration diagram of an image pickup system including a control apparatus according to the first embodiment.

FIG. 1 is a system configuration diagram of an image pickup system 1 that includes a control apparatus 1100 according to the first embodiment. The image pickup system 1 includes an image pickup apparatus 1000, the control apparatus 1100 of the image pickup apparatus 1000, and a network 1200. The image pickup apparatus 1000 and the control apparatus 1100 are connected to each other via the network 1200 so as to be able to communicate with each other. Thus, the image pickup apparatus 1000 can distribute video data (image) to the control apparatus 1100 via the network 1200. The control apparatus 1100 transmits various commands to the image pickup apparatus 1000. The image pickup apparatus 1000 transmits a response to these commands to the control apparatus 1100.

The network 1200 is configured by, for example, a plurality of routers, switches, cables, and the like that satisfy a communication standard such as Ethernet (Trademark). The communication standard, size, and configuration of the network 1200 are not limited if the network 1200 can communicate between the image pickup apparatus 1000 and the control apparatus 1100.

The network 1200 may be configured by, for example, the Internet, a wired LAN (Local Area Network), a wireless LAN (Wireless LAN), and a WAN (Wide Area Network). The image pickup apparatus 1000 in the present embodiment may support, for example, PoE (Power Over Ethernet (Trademark)) or may be supplied with power via a LAN cable.

Figure 2:
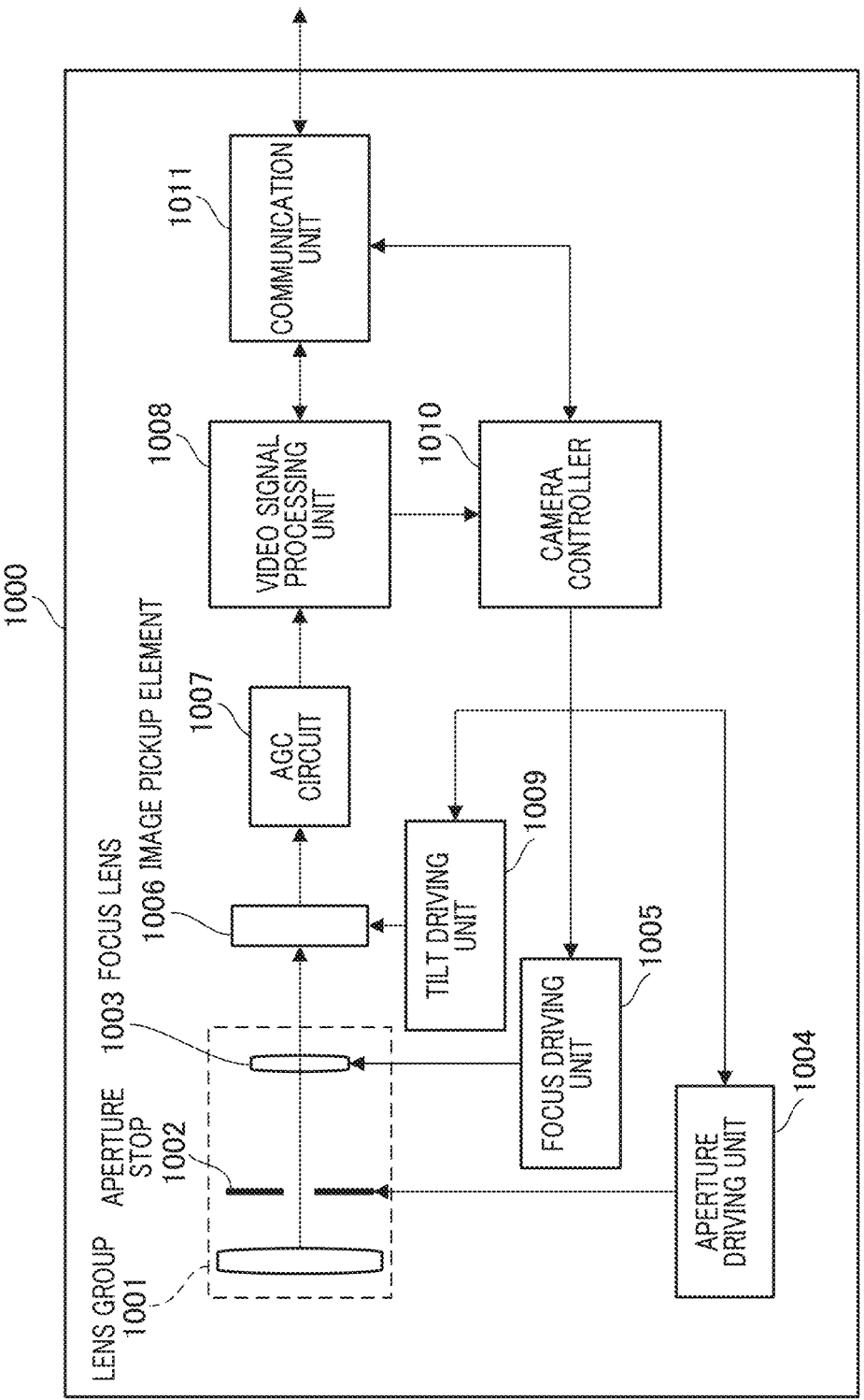
FIG. 2 is a block diagram illustrating a schematic configuration of an image pickup apparatus according to the first embodiment.

FIG. 2 is a block diagram illustrating a schematic configuration of the image pickup apparatus 1000 according to the first embodiment. The image pickup apparatus 1000 includes a lens group 1001, an aperture driving unit 1004, a focus driving unit 1005, an image pickup element 1006, an AGC (Automatic Gain Control) circuit 1007, a video signal processing unit 1008, a tilt driving unit 1009, a camera controller 1010, and a communication unit 1011.

The lens group 1001 includes an optical system that condenses light incident to the image pickup element 1006 from the object. The lens group 1001 includes an aperture stop 1002 and a focus lens 1003. The aperture stop 102 is driven by the aperture driving unit 1004, and an aperture diameter thereof is changed to adjust an amount of light passing through the lens group 1001. The focus lens 1003 is driven in the optical axis direction by the focus driving unit 1005 to perform focus adjustment.

The image pickup element 1006 converts the light received on a light receiving surface into an electric signal, and outputs the electric signal to the video signal processing unit 1008 via the AGC circuit 1007 that automatically controls an amplitude of the electric signal. Additionally, the tilt driving unit 1009 tilts a sensor surface of the image pickup element 1006. The tilt driving unit 1009 changes the tilt of the sensor surface of the image pickup element 1006, thereby changing the tilt angle. In the present specification, a relative angle between the lens group 1001 and the image pickup element 1006 is referred to as a "tilt angle".

The video signal processing unit 1008 generates video data obtained by performing a variety of image processing and encoding processing on the signal that has been input. The video signal processing unit 1008 receives a video data request command from the control apparatus 1100 via the communication unit 1011, and distributes the generated video data via the communication unit 1011.

The camera controller 1010 receives setting commands for the aperture value, the focus position, and the tilt angle from the control apparatus 1100 via the communication unit 1011. Additionally, the camera controller 1010 controls the aperture value, the focus position, and the tilt angle via the aperture driving unit 1004, the focus driving unit 1005, and the tilt drive unit 1009 based on the received setting commands. Further, the camera controller 1010 receives a request command for the aperture value, the focus position, and the aperture angle from the control apparatus 1100 via the communication unit 1011, and distributes the set value to the control apparatus 1100 via the communication unit 1011.

The communication unit 1011 distributes the video data to the control apparatus 1100 via the network 1200. The communication unit 1011 receives various commands transmitted from the control apparatus 1100 and transmits the commands to the video signal processing unit 1008 and the camera controller 1010.

Figure 3:
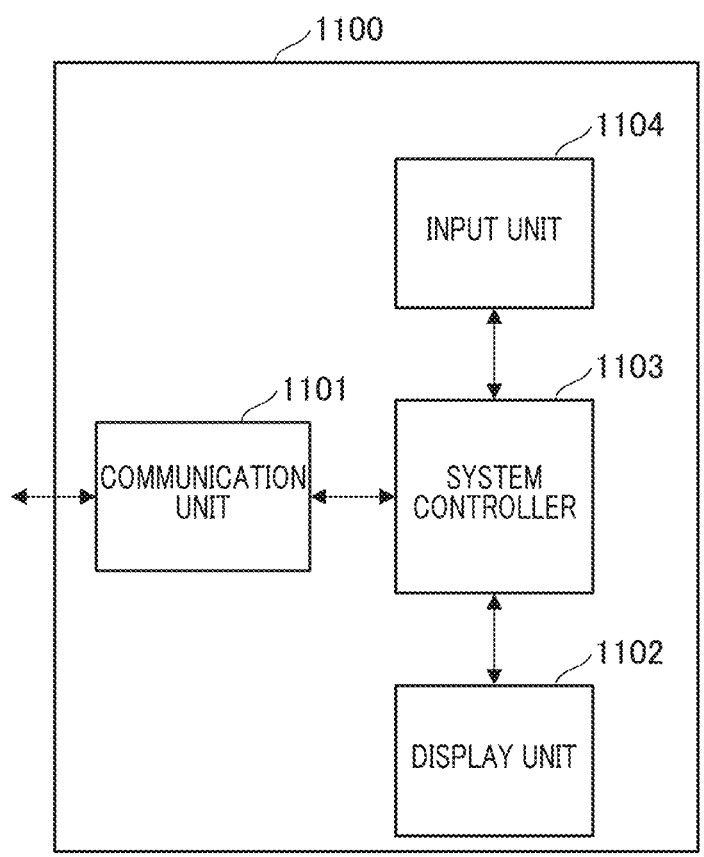
FIG. 3 is a block diagram illustrating a schematic configuration of the control apparatus according to the first embodiment.

FIG. 3 is a block diagram illustrating a schematic configuration of the control apparatus 1100 according to the first embodiment. The control apparatus 1100 is typically a general-purpose computer such as a personal computer. The control apparatus 1100 includes, for example, a communication unit 1101, a display unit 1102, a system controller 1103, and an input unit 1104.

The communication unit 1101 transmits various commands generated by the system controller 1103 to the image pickup apparatus 1000 via the network 1200 and receives various data distributed from the image pickup apparatus 1000 via the network 1200. The various commands mainly include a video data request command.

Moreover, the various commands include the request command for the aperture value, the focus position, and setting values of the tilt angle of the image pickup apparatus 1000. Furthermore, the various commands include the setting command for the aperture value, the focus position, and the tilt angle of the image pickup apparatus.

The display unit 1102 is an output device that performs display, for which a liquid crystal display device or the like is used, and displays a GUI (graphical user interface) for displaying video data acquired from the image pickup apparatus 1000 and controlling the image pickup apparatus 1000. The display unit 1102 may be integrated with the control apparatus 1100 or may be an external device connected to the control apparatus 1100.

The system controller 1103 generates a control command for the image pickup apparatus 1000 in response to a user's operation on the GUI, and transmits the control command to the image pickup apparatus 1000 via the communication unit 1101. Additionally, the system controller 1103 performs display control such as displaying the GUI on the display unit 1102.

As the input unit 1104, for example, a pointing device such as a keyboard and a mouse is used, and the user of the control apparatus 1100 operates the GUI via the input unit 1104. The input unit 1104 may be integrated with the control apparatus 1100 or may be an external device connected to the control apparatus 1100. The display unit 1102 may have a function of the input unit 1104, like a touch panel.

Figure 4:
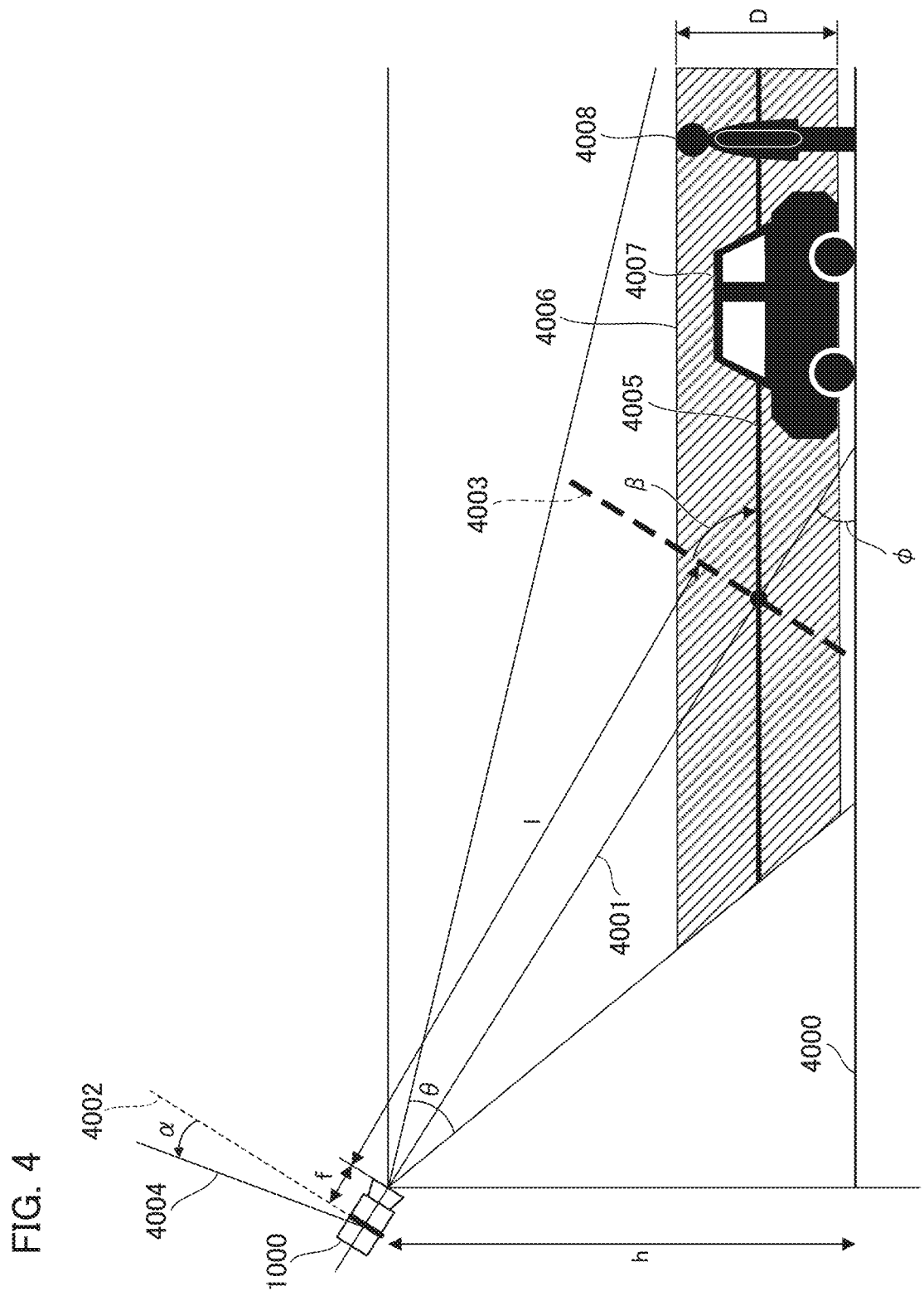
FIG. 4 is a schematic diagram illustrating an example of a use state of the image pickup apparatus according to the first embodiment.

FIG. 4 is a schematic diagram illustrating an example of the use state of the image pickup apparatus 1000 according to the first embodiment. The drawing shows a case in which an environment in which an image is being picked up by the image pickup apparatus 1000 is viewed from the side. The image pickup apparatus 1000 is installed at a height h with a tilt of an installation angle φ with respect to the road surface 4000, and images an image of a range of a field angle θ. Here, the installation angle φ is an angle formed by the optical axis of the image pickup apparatus 1000 and the road surface 4000.

A sensor surface 4002 indicates a sensor surface of the image pickup element 1006 in a non-tilted state and a focal plane 4003 indicates a focal plane of the image pickup apparatus 1000 in a non-tilted state. In a state in which the sensor surface 4002 is not tilted, the focal plane 4003 is perpendicular to the optical axis 4001 of the image pickup apparatus 1000.

A sensor surface 4004 indicates a sensor surface of the image pickup element 1006 in a tilted state. In this context, "tilt" means that the focal plane is tilted by tilting the image pickup optical system (lens group 1001) relative to the image pickup element or by tilting the image pickup element relative to the image pickup optical system, thereby to widen the depth of field with respect to the imaging angle along the ground (road surface 4000). In the present embodiment, although an example in which the tilt control is performed by tilting the sensor surface 4004 of the image pickup element 1006 with respect to the lens group 1001 will be described, the present invention is not limited thereto. Tilt control may be performed by tilting the lens group 1001 with respect to the sensor surface 4004 of the image pickup element 1006, or tilt control may be performed by tilting both the lens group 1001 and the image pickup element 1006.

The sensor surface 4004 shows a sensor surface upon tilting from the sensor surface 4002 by a tilt angle α, and the focal plane at that time is a focal plane 4005. An in-focus range 4006 shown by a hatched portion shows an in-focus range extending in the front and rear of the focal plane, and a vehicle 4007 and a person 4008 within the hatched portion can be regarded as being in focus.

In FIG. 4, the focal plane is present at a position away from the image pickup apparatus 1000 by a distance 1. That is, it can be said that the distance 1 is a distance from the image pickup apparatus 1000 to the focal plane. When the focal length of the image pickup apparatus 1000 is denoted by "f", the tilt angle α is calculated by the following formula (1) based on the principle of Scheimpflug:

[Formula 1]

$$\alpha = \arctan\left(\frac{f}{l \times \tan\varphi}\right) \quad (1)$$

The installation angle φ is calculated by the following formula (2):

[Formula 2]

$$\phi = \arctan\left(\frac{f}{l \times \tan\alpha}\right) \quad (2)$$

Further, a rotation angle β of the focal plane when the tilt angle is α is calculated by the following formula (3):

[Formula 3]

$$\beta = 1 \bigg/ \arctan\left(\frac{f}{l \times \tan\alpha}\right) \quad (3)$$

Additionally, the depth of field D of the in-focus range 4006 is calculated by the sum of the front depth of field Df and the rear depth of field Dr. When a permissible scattering circle is denoted by "R" and the aperture value is denoted by "F", the depth of field D is calculated by the following formula (4):

[Formula 4]

$$D = Df + Dr = \frac{R \times F \times l^2}{f^2 + R \times F \times l} + \frac{R \times F \times l^2}{f^2 - R \times F \times l} \quad (4)$$

Figure 5:
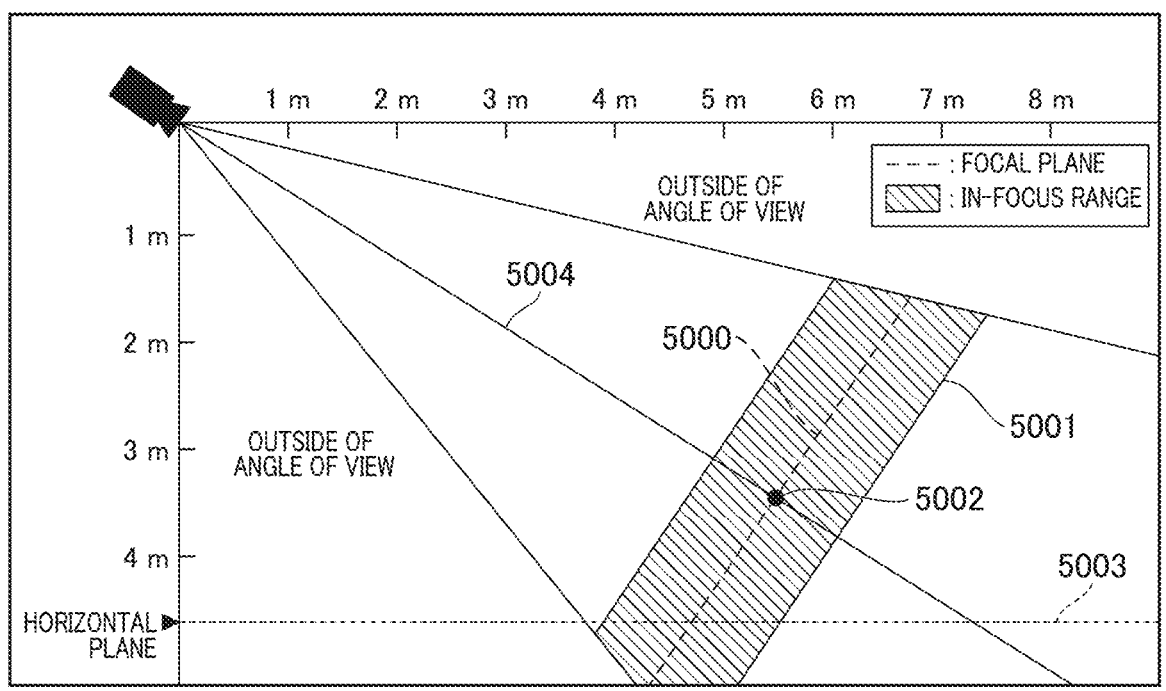
FIG. 5 is a schematic diagram illustrating an example of a GUI displayed on a display unit for a user to adjust an in-focus range.

FIG. 5 is a schematic diagram illustrating an example of a GUI for a user to adjust an in-focus range displayed on the display unit 1102. The display information of the GUI includes, for example, a distance from the image pickup apparatus 1000 to a focal plane 5000, the angle of the focal plane 5000, and the in-focus range 5001, and each corresponds to the distance 1, the rotation angle β, and the depth of field D in FIG. 4. Additionally, the angle of view (imaging range), the distance from the image pickup apparatus 1000 to a horizontal plane 5003 that serves as a reference, an optical axis 5004 of the image pickup apparatus 1000, in other words, the imaging direction of the image pickup apparatus 1000, and an intersection point 5002 of the focal plane 5000 and the optical axis 5004 can be displayed.

Figure 6:
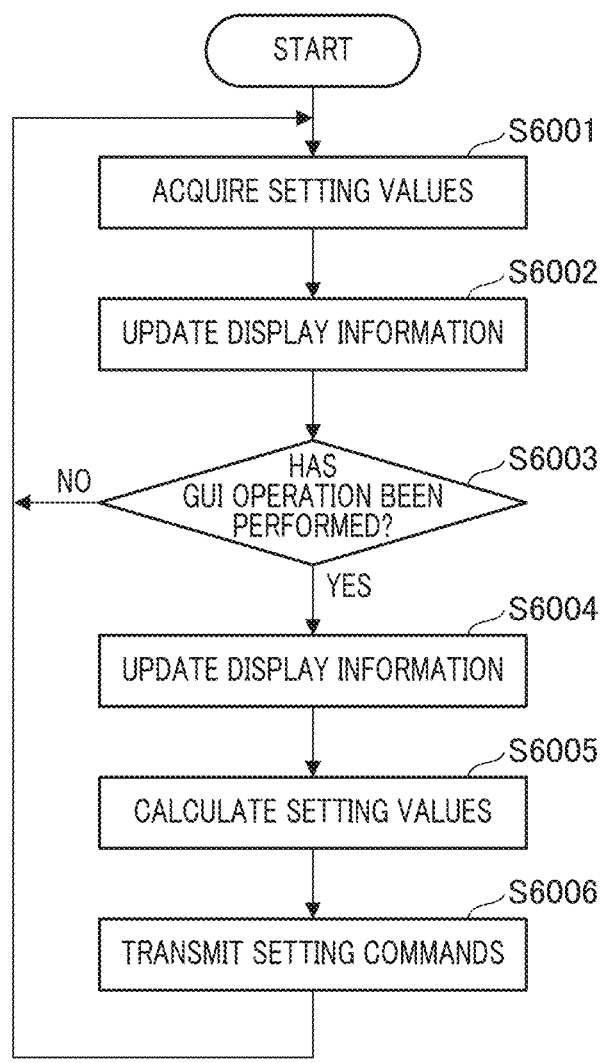
FIG. 6 is a flowchart illustrating an example of a process performed by the control apparatus during in-focus range setting.

FIG. 6 is a flowchart illustrating an example of the process performed by the control apparatus 1100 when the in-focus range is set. Each step can be mainly executed by the system controller 1103 that controls each unit. In step S6001, the system controller 1103 transmits the request command for the aperture value, the focus position, and setting values of the tilt angle to the image pickup apparatus 1000 via the communication unit 1101, and acquires the respective set values from the image pickup apparatus 1000.

In addition, a method for obtaining values such as an angle of view, a distance from the image pickup apparatus 1000 to a horizontal plane that serves as a reference, and an installation angle of the image pickup apparatus 1000 is not particularly limited. For example, a value that has been measured at the installation of the image pickup apparatus 1000 may be input during initial startup of the image pickup apparatus 1000 after the image pickup apparatus 1000 has been installed, or a value may be calculated based on the shot image by imaging a specific marker. If the image pickup apparatus has a PTZ (panning, tilting, and zooming) function, the display content may be corrected by separately obtaining a zoom magnification and a PTZ setting value from the image pickup apparatus 1000.

Subsequently, in step S6002, the system controller 1103 updates the display information of the GUI based on the set values acquired from the image pickup apparatus 1000. In step S6003, the system controller 1103 determines whether or not a GUI operation has been performed by the user. If the GUI operation has not been performed (NO), the process returns to step S6001, and if the GUI operation has been performed (YES), the process proceeds to step S6004.

In step S6004, the system controller 1103 updates the display information in accordance with the set values changed by the GUI operation. In the present embodiment, as an example, it is assumed that the user can change the set values by operating the GUI via the input unit 1104. Specifically, the user rotates the focal plane 5000, enlarges/reduces the in-focus range 5001, and moves the intersection point 5002 of the focal plane 5000 and the optical axis 5004 along the optical axis 5004 in FIG. 5, thereby to enable changing the set values.

FIG. 7A to 7D illustrate an example of the GUI operation. This screen is displayed on the display unit 1102. In the drawing, a drag operation using a mouse serving as the input unit 1104 is assumed. However, the present invention is not limited thereto and a keyboard or a touch panel may be used for performing the operation.

Figure 7A:
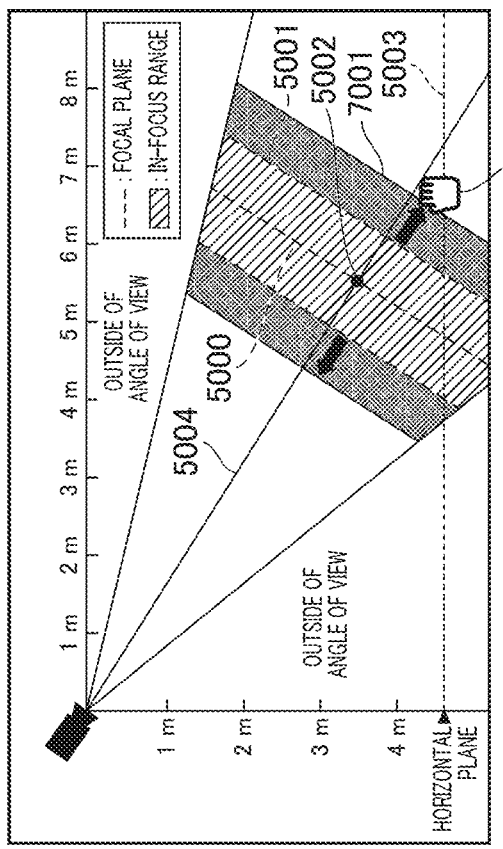
FIG. 7A to 7D illustrate an example of a GUI operation.

FIG. 7A illustrates an example in which the focal plane 5000 is rotated to change to a focal plane 7000. The rotation angle can be changed by positioning a cursor 7004 on the focal plane 5000 and dragging the focal plane 5000 to the position of the focal plane 7000. In other words, the tilt angle can be changed by driving the image pickup element 1006 by the tilt driving unit 1009 by the operation to rotate the focal plane 5000.

Figure 7B:
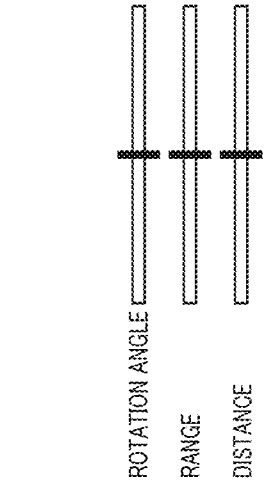

FIG. 7B illustrates an example in which the in-focus range 5001 is enlarged so as to be changed to the in-focus range 7001. The depth of field can be changed by positioning the cursor 7004 on the in-focus range 5001 and dragging the in-focus range 5001 to the position of the in-focus range 7001. In other words, the aperture diameter of the aperture stop 1002 can be changed by driving the aperture stop 1002 by the aperture driving unit 1004 by the operation to enlarge the in-focus range 5001.

Figure 7C:
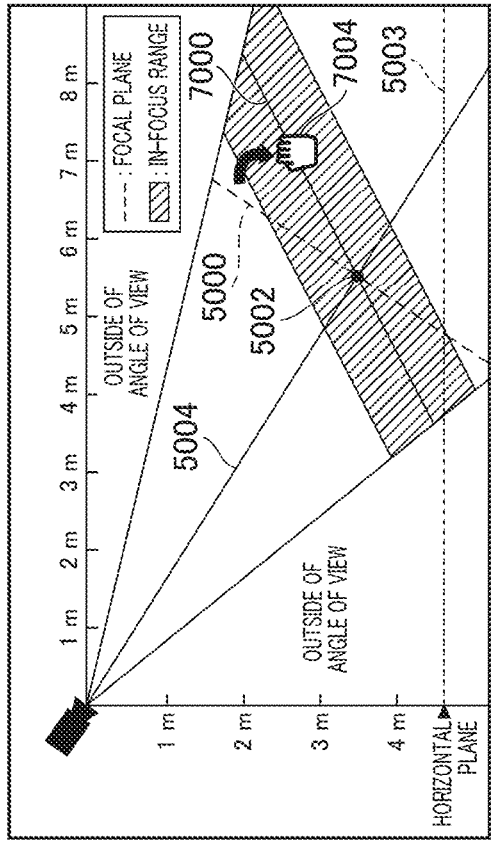

FIG. 7C illustrates an example in which the intersection point 5002 of the focal plane 5000 and the optical axis 5004 is moved so as to be changed to an intersection point 7002. The position of the focal plane can be changed by positioning the cursor 7004 at the intersection point 5002 and dragging the intersection point 5002 to the position of the intersection point 7002. In other words, the focus position can be changed by driving the focus lens 1003 by the focus driving unit 1005 by the operation to move the intersection point 5002. At this time, the aperture stop 1002 and the image pickup element 1006 are also controlled so as not to change the tilt angle and the depth of field.

Figure 7D:
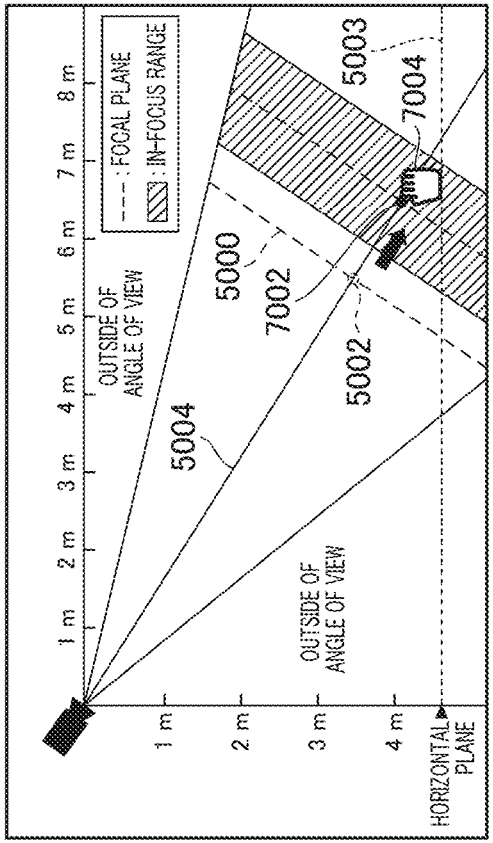

FIG. 7D illustrates an example in which each change is performed by an operation using a slider. As shown in FIG. 7D, each change may be performed by displaying the slider corresponding to the rotation angle of the focal plane, the in-focus range, and the distance from the image pickup apparatus 1000 to the focal plane, and dragging the slider.

Additionally, each change may be performed by displaying numerical values corresponding to the rotation angle of the focal plane, the in-focus range, and the distance from the image pickup apparatus 1000 to the focal plane, and changing this numerical value, for example, by a keyboard serving as an input unit. Furthermore, these examples may be used in combination.

If the image pickup apparatus has the PTZ function, the values of panning, tilting, and zooming may be changeable by the drag operation, the operation using the slider, and the operation of changing numerical values in a manner similar to the above.

As described above, the user can intuitively grasp the position and size of the in-focus range by causing the display unit 1102 to display the in-focus range with symbols such as graphics and numerical values to serve as display information and expressing the change in the in-focus range by, for example, rotating, moving, or enlarging/reducing the graphics. Therefore, it is not necessary to consider the relation between the aperture value, the focus position, and the tilt angle, and the in-focus range.

Figure 8:
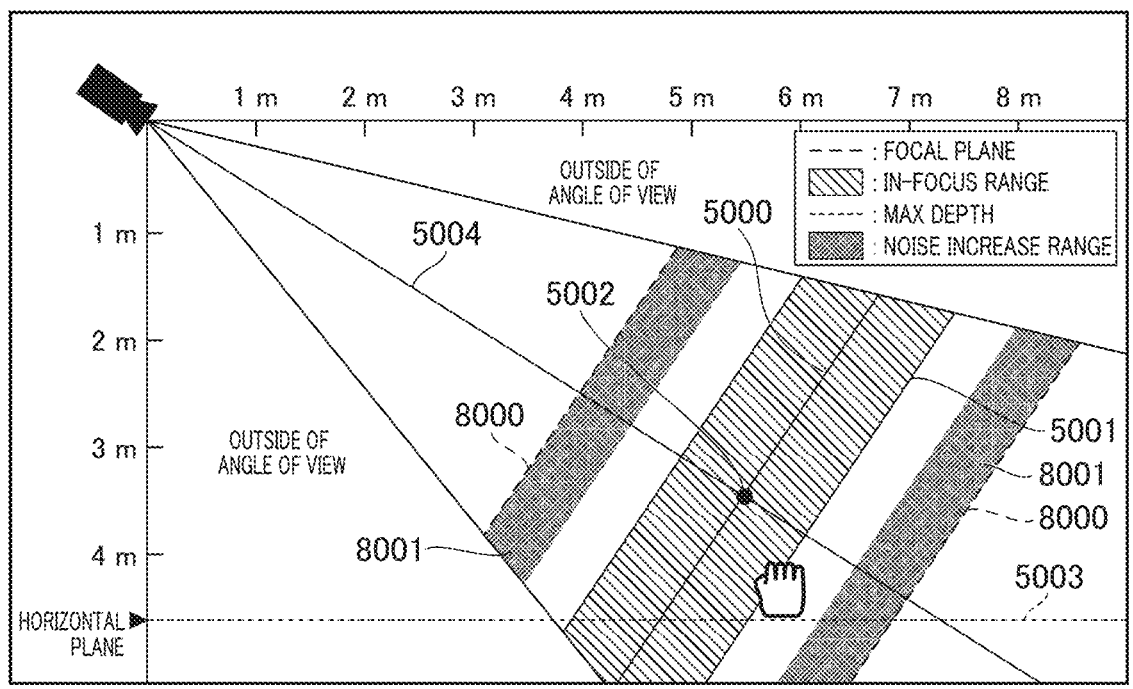
FIG. 8 illustrates an example in which a movable range and a warning range are added to serve as display information of the in-focus range.

FIG. 8 illustrates an example in which a movable range and a warning range are added as display information of the in-focus range. In the example, the display unit 1102 displays a boundary 8000 of the movable range in which the aperture stop 1002 can be driven, and a warning range 8001. When the in-focus range is enlarged, the aperture stop is changed so that a gain is increased by the AGC circuit 1007 depending on the imaging environment, and the noise of the shot image may be increased. Accordingly, when the in-focus range is enlarged/reduced by the GUI operation, as the display information of the GUI, a range exceeding a predetermined gain value within a movable range, in other words, a range in which noise exceeds a predetermined amount, may be displayed in advance to serve as the warning range 8001. If a GUI operation is performed so as to exceed a predetermined gain value, in other words, if the in-focus range is changed so as to fall the warning range 8001, a warning such as displaying a warning related to an increase in noise or issuing a warning sound may be performed.

The system controller 1103 may request the image pickup apparatus 1000 to provide a range in which the aperture value, the focus position, and the tilt angle can be set (hereinafter, simply referred to as a "settable range"), in other words, the range in which the aperture stop 1002, the focus lens 1003, and the image pickup element 1006 can also be driven. Thus, the movable range of the in-focus range corresponding to the settable range can also be displayed. The system controller 1103 acquires settable ranges for each of the tilt angle, the aperture value, and the focus position from the image pickup apparatus 1000. Next, the system controller 1103 causes the display unit 1102 to display the possible range of rotation, the possible range of enlargement/reduction, and the possible range of movement in accordance with the settable range when any one of the above-described rotation, enlargement/reduction, and movement is performed on the graphic, which serves as the display information.

The description will return to FIG. 6. When the update of the display information in step S6004 has been completed, in step S6005, the system controller 1103 calculates various set values in accordance with the GUI operation. At this time, when the rotation angle is changed due to the rotation of the focal plane and the like, the tilt angle is calculated by using the formula (3). If the depth of field has been changed due to enlargement/reduction of the in-focus range and the like, the system controller 1103 calculates an aperture value by using the formula (4). Additionally, if the distance from the image pickup apparatus 1000 to the focal plane has been changed, as shown in the formulae (3) and (4), the tilt angle and the depth of field vary depending on the distance from the image pickup apparatus 1000 to the focal plane and the focal length. Therefore, the system controller 1103 calculates the corresponding focus position and recalculates the tilt angle and the aperture value so as not to change the tilt angle and the depth of field.

In step S6006, the set value that has been calculated in step S6005 is converted into a set command and transmitted to the image pickup apparatus 1000 via the communication unit 1101.

In the present embodiment, although an example has been described in which the flow of FIG. 6 is mainly executed by the system controller 1103 of the control apparatus 1100, the flow may be executed by the camera controller 1010 of the image pickup apparatus 1000.

According to the present embodiment, in an image pickup apparatus that can change a tilt angle, it is possible to easily change various settings, and in particular, it is possible to easily set the in-focus range.

Second Embodiment

Figure 9:
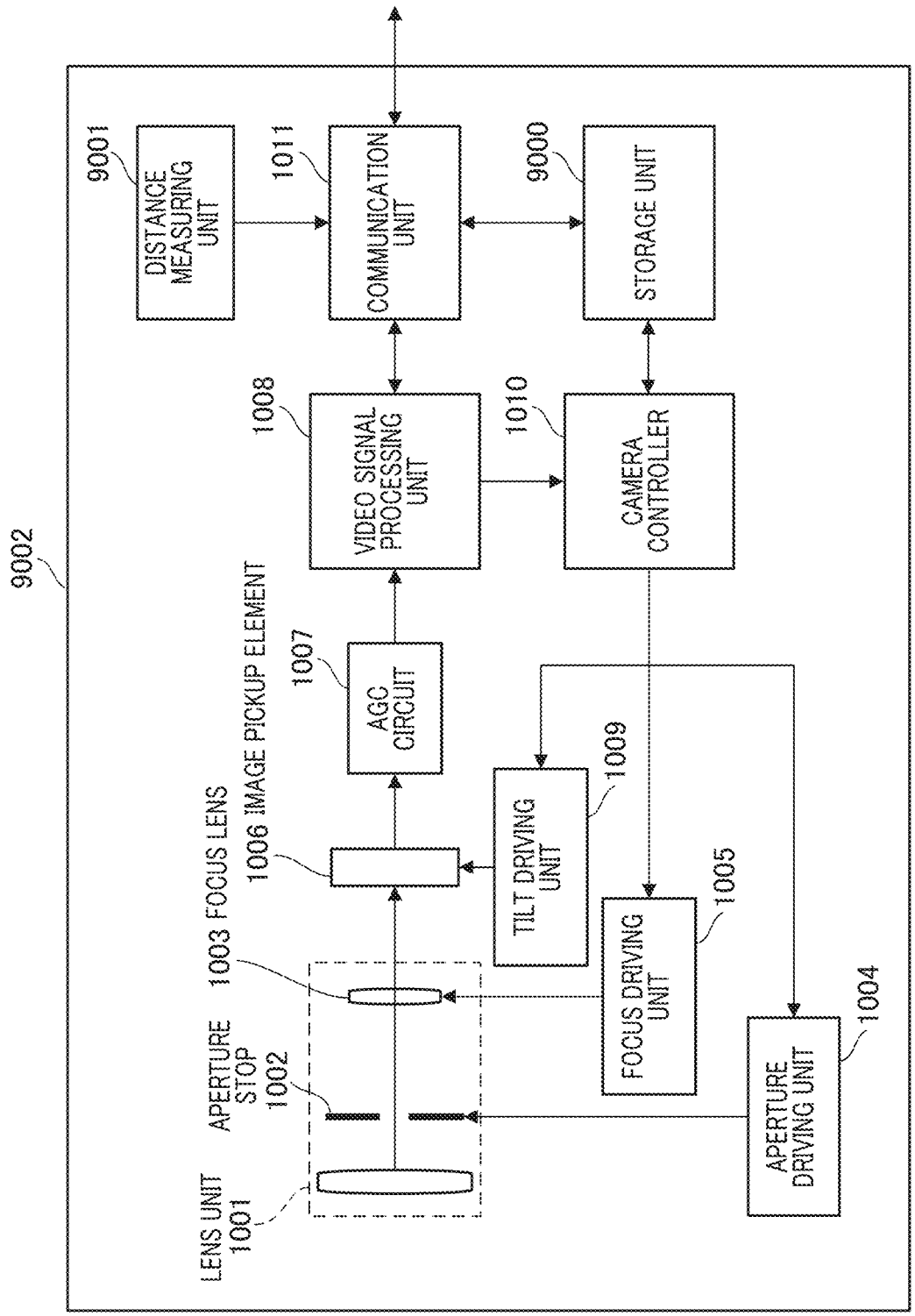
FIG. 9 is a block diagram illustrating a schematic configuration of the image pickup apparatus according to the second embodiment.

FIG. 9 is a block diagram illustrating a schematic configuration of an image pickup apparatus 9002 according to the second embodiment. Regarding the configuration of the image pickup apparatus, the parts that are the same as those of the image pickup apparatus in the first embodiment will not be described. As shown in FIG. 9, the image pickup apparatus 9002 according to the second embodiment includes a storage unit 9000 and a distance measuring unit 9001 in addition to the configuration shown in FIG. 2. The storage unit 9000 stores setting information related to a plurality of in-focus ranges in accordance with predetermined conditions. Additionally, the distance measuring unit 9001 measures a distance from the object.

For example, in a surveillance camera, the illuminance may change as time passes. In order to maintain the exposure properly, when the illuminance decreases, it is necessary to almost fully open the aperture stop compared to the aperture stop set when the monitoring camera is installed. Therefore, in the second embodiment, a plurality of in-focus ranges is set in accordance with the illuminance.

Figure 10A:
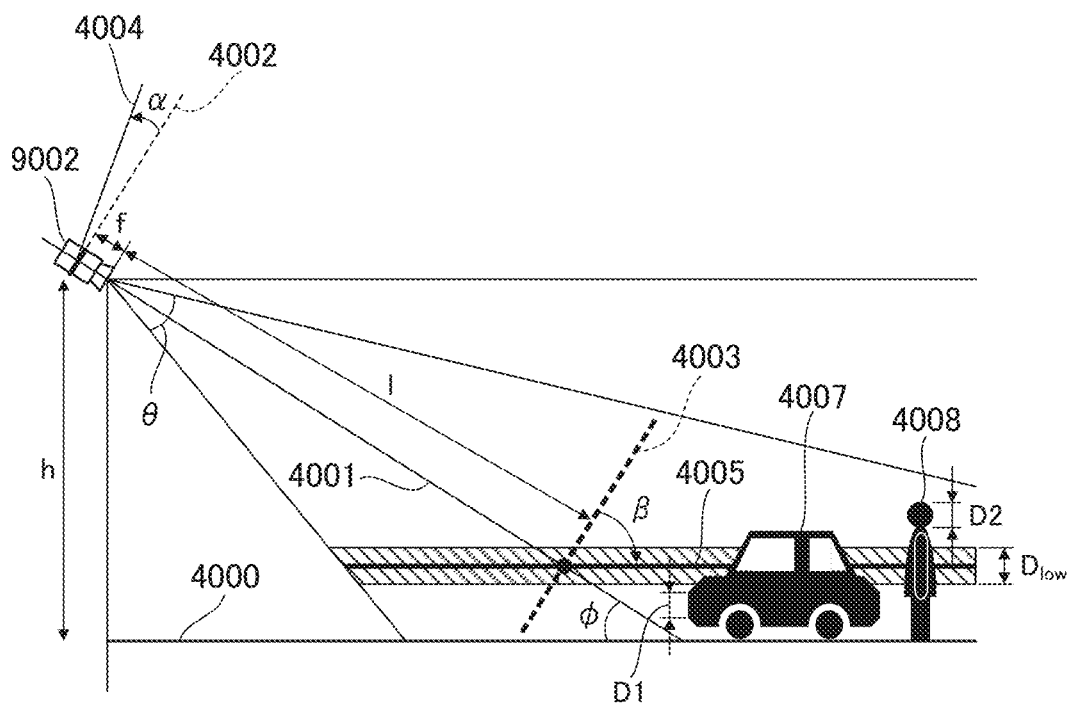
FIGS. 10A and 10B illustrate an example of the in-focus range when an illuminance is lowered.

FIG. 10 illustrates an example of an in-focus range if the illuminance decreases. FIG. 10A illustrates an example of the in-focus range if the illuminance decreases from the state of FIG. 4 and the aperture stop almost fully opens. At this time, although the tilt angle and the focus position are maintained, the in-focus range is reduced by opening the aperture stop almost fully, and as a result, neither a range D1 of the license plate of the vehicle 4007 nor a range D2 of the face of the person 4008 are in focus.

Figure 10B:
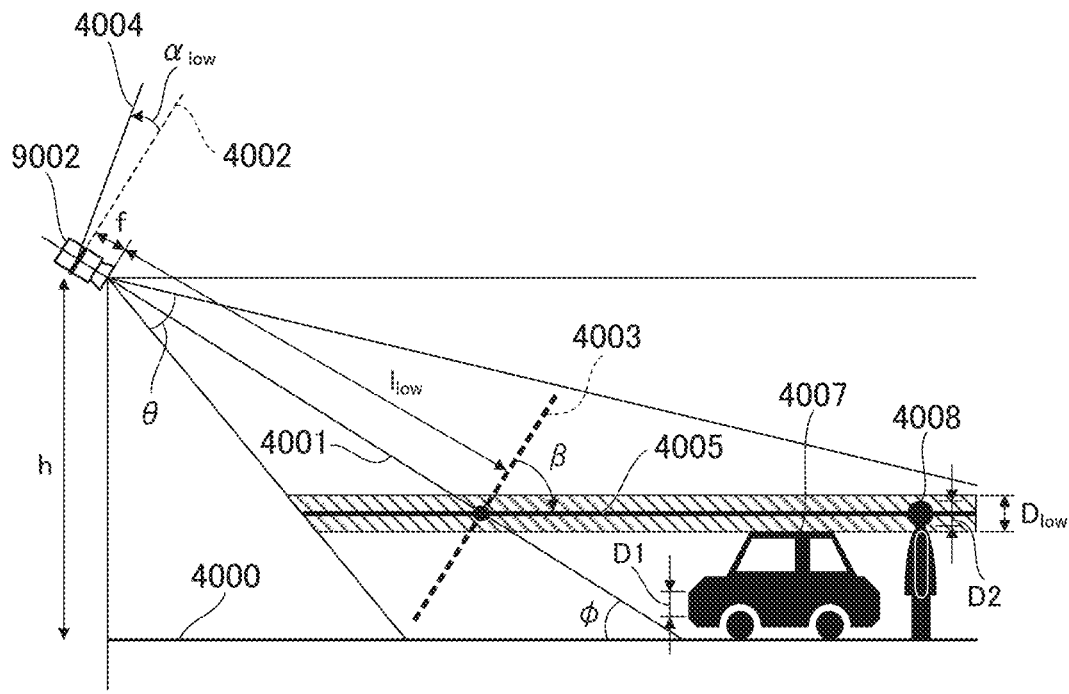

FIG. 10B illustrates an example of an in-focus range if the tilt angle is changed to the tilt angle α low and the distance from the image pickup apparatus 9002 to the focal plane is changed to the distance I low in accordance with the change of the aperture stop. In this case, although the range D1, which is the license plate of the vehicle 4007, is not in-focus, the range D2, which is the face of the person 4008, is in-focus. However, at this time, the priority for adjusting the in-focus range to either the range D1 or the range D2 under low-illumination intensity may be different depending on the imaging environment and the imaging purpose.

In the present embodiment, after the in-focus range for a sufficient illuminance environment is set by using the control apparatus 1100, the in-focus range for a low illuminance environment is set. Here, the sufficient illuminance environment is an environment in which the illuminance is higher than that in a low illuminance environment, for example, outdoors in the daytime or indoors under fluorescent light, and the low illuminance environment is an environment in which the illuminance is lower than that in a sufficient illuminance environment, for example, outdoors at night. The setting information of a plurality of in-focus ranges is transmitted from the system controller 1103 to the image pickup apparatus 9002 via the communication unit 1101 and is stored in the storage unit 9000.

Subsequently, the camera controller 1010 determines whether the illuminance environment is the sufficient illuminance environment or the low illuminance environment based on the exposure setting value. When the camera controller 1010 determines that the illuminance environment is the sufficient illuminance environment, the camera controller 1010 controls the aperture value, the focus position, and the tilt angle based on the setting information of the in-focus range for the sufficient illuminance environment stored in the storage unit 9000. If it is determined that the illuminance environment is the low illuminance environment, the camera controller 1010 controls the aperture value, the focus position, and the tilt angle based on the setting information of the in-focus range for the low illuminance environment stored in the storage unit 9000.

Note that the setting of the in-focus range may be performed in a stepwise manner with respect to the illuminance, and the control of the aperture value, the focus position, and the tilt angle by the camera controller 1010 may also be performed in a stepwise manner by interpolation from the setting information.

Further, the control apparatus 1100 may be provided with a storage unit, and settings related to a plurality of in-focus ranges may be stored in the storage unit of the control apparatus 1100. For example, it is assumed that the in-focus range for the sufficient illuminance environment and the in-focus range for the low illuminance environment are stored in the storage unit of the control apparatus 1100. The camera controller 1010 determines whether the illuminance environment is the sufficient illuminance environment or the low illuminance environment based on the exposure setting value, and outputs the determination result to the control apparatus 1100. The control apparatus 1100 transmits the setting command of the in-focus range for the sufficient illuminance environment or the setting command of the in-focus range for the low illuminance environment to the image pickup apparatus 9002 in accordance with the determination result.

Figure 11:
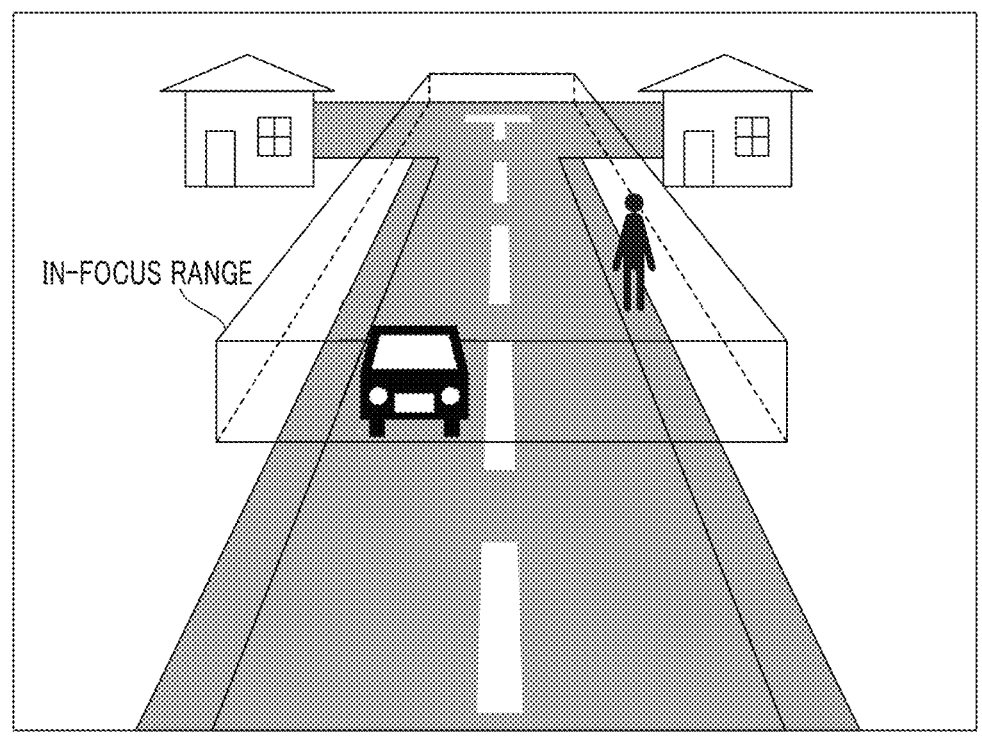
FIG. 11 illustrates an example in which the in-focus range is superimposed on a shot image distributed from the image pickup apparatus.
Figure 12:
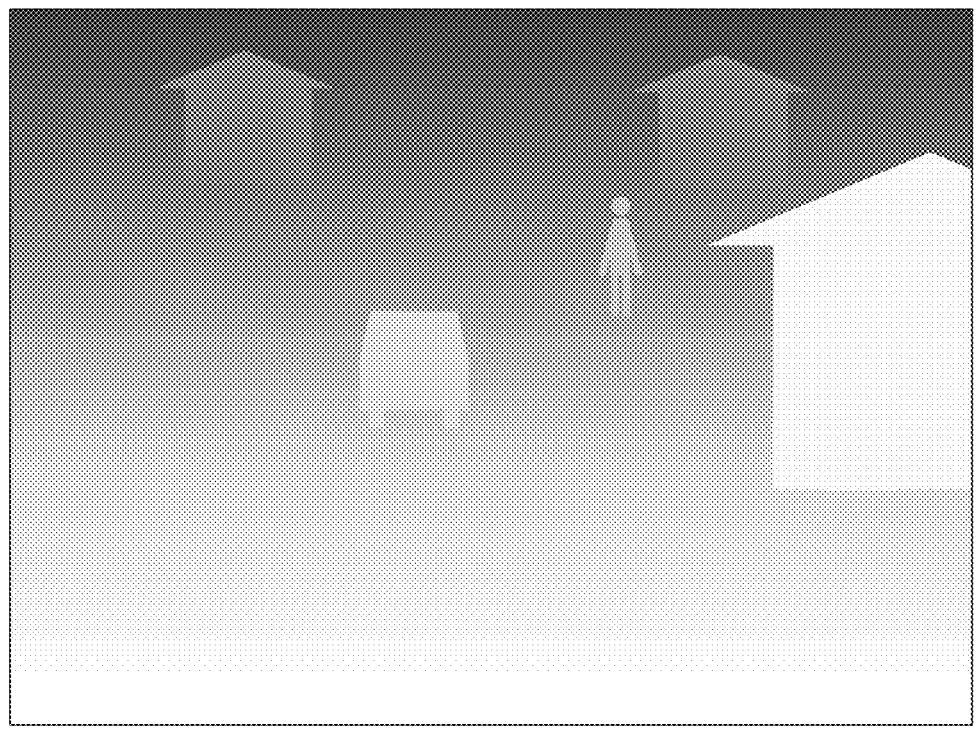
FIG. 12 illustrates an example of a depth map.

Additionally, even if the relative positional relation between the image pickup apparatus 9002 and the in-focus range and the size of the in-focus range can be grasped, there are cases in which it is desirable to check a range where the in-focus range exists for the shot image during the setting of the in-focus range. Therefore, in the second embodiment, the in-focus range is superimposed and displayed on the captured image. FIG. 11 illustrates an example in which the in-focus range is superimposed on a shot image distributed from the image pickup apparatus 9002. As shown in FIG. 11, since the actual in-focus range exists as a three-dimensional region, depth information corresponding to the shot image is required when the in-focus range is superimposed and displayed on the captured image. Although the distance measuring means is not particularly limited, it is desirable to obtain the depth information for the entire imaging scene as in the depth map shown in FIG. 12.

The control apparatus 1100 acquires a shot image and the depth information from the image pickup apparatus via the communication unit 1101 and calculates the positional relation between the image pickup apparatus 9002 and an object on the three-dimensional space. Subsequently, the in-focus range calculated based on the aperture value, the focus position, and the tilt angle of the image pickup apparatus 9002 is superimposed and displayed on the shot image. Note that the image pickup apparatus 9002 may calculate the in-focus range and output the shot image superimposed on the in-focus range to the control apparatus 1100.

Figure 13:
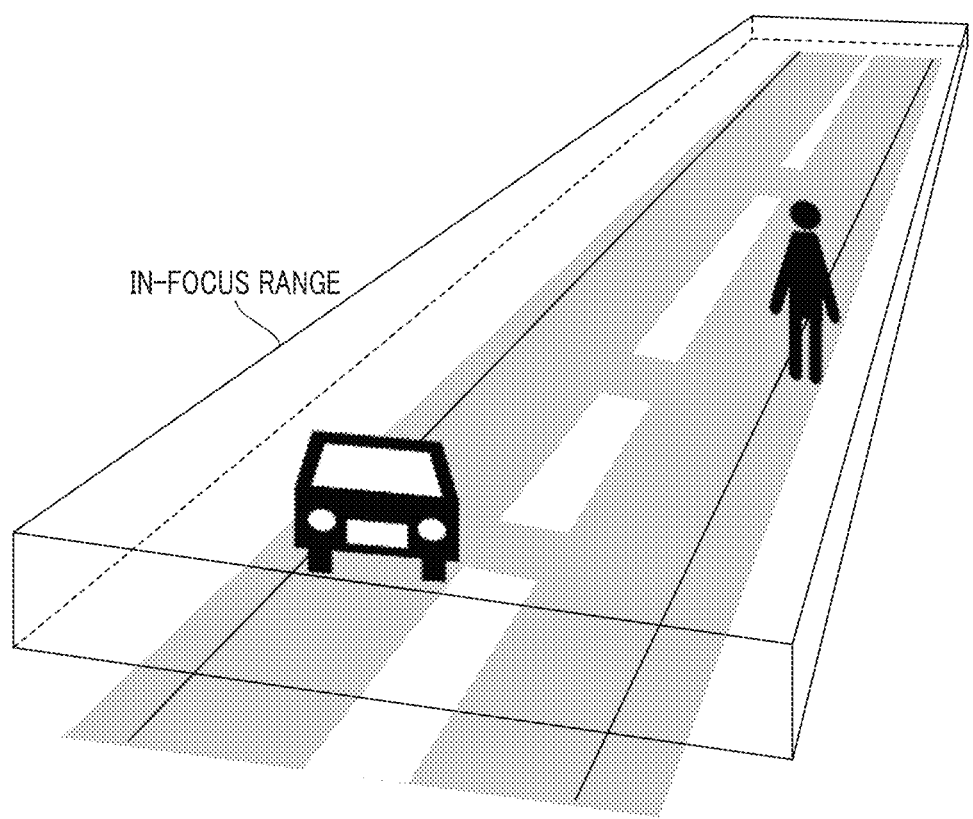
FIG. 13 illustrates an example in which the in-focus range is superimposed on a virtual viewpoint image.

Similar to the first embodiment, a function of adjusting the in-focus range by rotating, moving, and enlarging and/or reducing the in-focus range superimposed and displayed, serving as a GUI, may be used. FIG. 13 illustrates an example in which the in-focus range is superimposed on a virtual viewpoint image. If the in-focus range superimposed on the shot image is adjusted, the viewpoint for the object is limited, so that the visibility for the in-focus range and the operability during adjustment may be lower depending on the settings of the in-focus range. Therefore, it may be possible to add a function for generating a virtual viewpoint image shot from a direction different from the imaging direction by using the depth information, and adjusting an in-focus range superimposed and displayed on the virtual viewpoint image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-053320, filed Mar. 20, 2019, which is hereby incorporated by reference wherein in its entirety.

What is claimed is:

1. A control apparatus of an image pickup apparatus including a tilt changing unit that changes a tilt angle that is a relative angle between a lens and an image pickup element and an aperture driving unit that drives an aperture stop, the control apparatus comprising:
   a hardware processor; and
   a memory for storing instructions to be executed by the hardware processor, wherein, when the instructions stored in the memory are executed by the hardware processor, the control apparatus functions as:
   a request unit configured to request the image pickup apparatus to provide any one of at least the tilt angle, an aperture value, and a focus position; and
   a display controlling unit configured to cause a display unit to display a graphic showing an in-focus range of the image pickup apparatus based on the tilt angle, the aperture value, and the focus position,
   wherein the in-focus range is changed by performing any one of at least rotating, enlarging and/or reducing, and moving the graphic.

2. The control apparatus according to claim 1,
wherein the display controlling unit causes the display unit to display an imaging direction or an imaging range of the image pickup apparatus.

3. The control apparatus according to claim 1,
wherein, when the instructions stored in the memory are executed by the hardware processor, the control apparatus further functions as a setting unit configured to set any one of at least the tilt angle, the aperture value, and the focus position in the image pickup apparatus, and
wherein the display controlling unit changes the graphic displayed on the display unit based on any one of at least the tilt angle, the aperture value, and the focus position set by the setting unit.

4. The control apparatus according to claim 1,
wherein the display controlling unit causes the display unit to display a range in which noise of an image shot by the image pickup apparatus exceeds a predetermined amount together with the graphic, and provides a warning if the in-focus range is changed to a range in which noise exceeds the predetermined amount.

5. The control apparatus according to claim 1,
wherein, in acquiring a settable range for each of the tilt angle, the aperture value, and the focus position and performing any one of rotating, enlarging/reducing, and moving the graphic, the display controlling unit causes the display unit to display a possible range for the rotation, the enlargement/reduction, and the moving of the graphic in accordance with the settable range.

6. The control apparatus according to claim 1,
wherein the display controlling unit includes a storage unit configured to store settings related to a plurality of in-focus ranges in accordance with a predetermined condition, and sets the in-focus range stored in the storage unit in accordance with the predetermined condition.

7. The control apparatus according to claim 1,
wherein the image pickup apparatus includes a distance measurer measuring a distance from the image pickup apparatus to an object, and
wherein the display controlling unit superimposes the in-focus range on an image output from the image pickup apparatus and displays the image having the in-focus range on the display unit.

8. The control apparatus according to claim 1, further comprising the display unit.

9. A control method of an image pickup apparatus that includes a tilt changing unit that changes a tilt angle that is a relative angle between a lens and an image pickup element and an aperture driving unit that drives an aperture stop, the method comprising:
   requesting the image pickup apparatus to provide any one of at least a tilt angle, an aperture value, and a focus position; and performing display-control by causing a display unit to display a graphic showing an in-focus range of the image pickup apparatus based on the tilt angle, the aperture value, and the focus position,
wherein the in-focus range is changed by performing any one of at least rotating, enlarging and/or reducing, and moving the graphic.

10. A non-transitory storage medium on which is stored a computer program for making a computer execute a method for controlling an image pickup apparatus that includes a tilt changing unit that changes a tilt angle that is a relative angle between a lens and the image pickup apparatus and an aperture driving unit that drives an aperture stop, the method combining:
   requesting the image pickup apparatus to provide any one of at least a tilt angle, an aperture value, and a focus position; and
   performing display-control by causing a display unit to display a graphic showing an in-focus range of the image pickup apparatus based on the tilt angle, the aperture value, and the focus position,
   wherein the in-focus range is changed by performing any one of at least rotating, enlarging and/or reducing, and moving the graphic.

* * * * *